(12) United States Patent
Uchimi et al.

(10) Patent No.: US 11,553,646 B2
(45) Date of Patent: Jan. 17, 2023

(54) LAWN MOWER HAVING A REDUCED UNEVEN DISTRIBUTION OF DISCHARGED GRASS CLIPPINGS

(71) Applicant: HONDA MOTOR CO., LTD., Tokyo (JP)

(72) Inventors: Makoto Uchimi, Saitama (JP); Nobuo Yamazaki, Saitama (JP); Hajime Yoshimura, Saitama (JP); Kenta Kohigashi, Saitama (JP); Ryota Hisada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 385 days.

(21) Appl. No.: 16/803,538

(22) Filed: Feb. 27, 2020

(65) Prior Publication Data

US 2020/0305344 A1    Oct. 1, 2020

(30) Foreign Application Priority Data

Mar. 28, 2019    (JP) .............................. JP2019-062686

(51) Int. Cl.
| | | |
|---|---|---|
| *A01D 34/71* | (2006.01) | |
| *A01D 43/063* | (2006.01) | |
| *A01D 34/81* | (2006.01) | |
| *A01D 34/68* | (2006.01) | |

(52) U.S. Cl.
CPC ............. *A01D 34/71* (2013.01); *A01D 34/68* (2013.01); *A01D 34/81* (2013.01); *A01D 43/063* (2013.01)

(58) Field of Classification Search
CPC ...... A01D 34/71; A01D 34/005; A01D 34/68; A01D 34/667; A01D 34/81; A01D 34/82; A01D 43/06; A01D 43/063; A01D 43/0631
See application file for complete search history.

(56) References Cited

U.S. PATENT DOCUMENTS

| | | | | |
|---|---|---|---|---|
| 3,872,656 | A * | 3/1975 | Dahl ................. | A01D 43/0631 56/320.2 |
| 3,971,198 | A * | 7/1976 | Lane .................... | A01D 43/063 56/16.6 |
| 4,103,478 | A * | 8/1978 | Schaefer .............. | A01D 43/063 56/16.6 |
| 4,238,918 | A * | 12/1980 | Saruhashi ............ | A01D 43/063 56/320.2 |

(Continued)

FOREIGN PATENT DOCUMENTS

JP        S63-061223 A    4/1988

*Primary Examiner* — Adam J Behrens
(74) *Attorney, Agent, or Firm* — Paratus Law Group, PLLC

(57) ABSTRACT

A lawn mower includes a cutter blade that cuts grass, a body portion including a housing containing the cutter blade, and a grass clippings discharge passage that discharges grass clippings cut by the cutler blade from the housing, a grass clippings container that contain grass clippings, and an opening degree adjust valve. The grass clippings discharge passage includes an upstream opening connected to the housing, and a downstream opening for ejecting grass clippings to outside of the body portion. The opening degree adjust valve is provided at the downstream opening of the grass clippings discharge passage and adjusts an opening degree of the downstream opening.

4 Claims, 8 Drawing Sheets

(56) References Cited

U.S. PATENT DOCUMENTS

| | | | | |
|---|---|---|---|---|
| 4,989,400 | A * | 2/1991 | Wark | A01D 43/063 |
| | | | | 383/42 |
| 5,435,118 | A * | 7/1995 | Cobile | A01D 34/005 |
| | | | | 56/16.9 |
| 6,862,875 | B2 * | 3/2005 | Iida | A01D 34/71 |
| | | | | 56/320.2 |
| 7,249,450 | B2 * | 7/2007 | Iida | A01D 42/005 |
| | | | | 56/320.2 |
| 9,043,957 | B2 * | 6/2015 | Kaskawitz | A01D 67/00 |
| 10,219,432 | B2 * | 3/2019 | Shoji | A01D 43/063 |
| 2011/0011047 | A1 * | 1/2011 | Tamas | A01D 34/824 |
| | | | | 56/16.6 |
| 2013/0097987 | A1 * | 4/2013 | Kaskawitz | A01D 42/00 |
| | | | | 56/320.2 |
| 2016/0309649 | A1 * | 10/2016 | Shoji | A01D 34/71 |

* cited by examiner

LAWN MOWER HAVING A REDUCED UNEVEN DISTRIBUTION OF DISCHARGED GRASS CLIPPINGS

CROSS-REFERENCE TO RELATED APPLICATIONS

The present application claims the benefit of priority of Japanese Patent Application No. 2019-062686, filed on Mar. 28, 2019, the content of which is incorporated herein by reference.

TECHNICAL FIELD

Aspects of the present invention relate to a lawn mower.

BACKGROUND ART

There has been known a lawn mower including a cutter blade attached rotatably thereto, a body portion including a housing that contains the cutter blade, and a grass clippings container. Grass clippings cut by the cutter blade are ejected to the outside of the body portion from the housing.

For example, JP-UM-A-63-061223 discloses a lawn mower including a grass clippings discharge passage that discharges grass clippings cut by a cutter blade from a housing to a rear surface of a body portion. Grass clippings cut by the cutter blade are contained in a grass clippings container through the grass clippings discharge passage from the housing. The grass clippings container is detachably attached to the rear surface of the body portion.

The grass clippings discharge passage of the lawn mower in JP-UM-A-63-061223 includes an upstream opening connected to the housing and a downstream opening opened to the rear surface of the body portion.

In the lawn mower of JP-UM-A-63-061223, grass clippings cut by the cutter blade may be unevenly distributed in the vicinity of the downstream opening of the grass clippings discharge passage when being contained in the grass clippings container.

SUMMARY

Accordingly, an aspect of the present invention provides a lawn mower capable of reducing uneven distribution of grass clippings contained in a grass clippings container in the vicinity of a downstream opening of a grass clippings discharge passage.

According to an embodiment of the present invention, there is provided a lawn mower includes:
a power source;
a rotation shaft configured to be rotated by power of the power source;
a cutter blade configured to be rotated by the rotation shaft so as to cut grass;
a body portion including a housing containing the cutter blade, and a grass clippings discharge passage configured to discharge grass clippings cut by the cutter blade from the housing;
a grass clippings container detachably attached to the body portion and configured to contain grass clippings; and
an opening degree adjust valve,
wherein the grass clippings discharge passage includes:
an upstream opening connected to the housing; and
a downstream opening for ejecting grass clippings to outside of the body portion,
wherein the grass clippings container is provided to cover the downstream opening of the grass clippings discharge passage and configured to contain grass clippings ejected from the downstream opening of the grass clippings discharge passage, and
wherein the opening degree adjust valve is provided at the downstream opening of the grass clipping discharge passage and is configured to adjust an opening degree of the downstream opening.

According to the above configuration, a flow speed of grass clippings passing through the downstream opening of the grass clippings discharge passage can be increased by reducing the opening degree of the downstream opening of the grass clippings discharge passage. Accordingly, grass clippings can fly far away from the downstream opening of the grass clippings discharge passage and uneven distribution of grass clippings contained in the grass clippings container can be reduced in the vicinity of the downstream opening of the grass clippings discharge passage.

DESCRIPTION OF EMBODIMENTS

Figure 1:
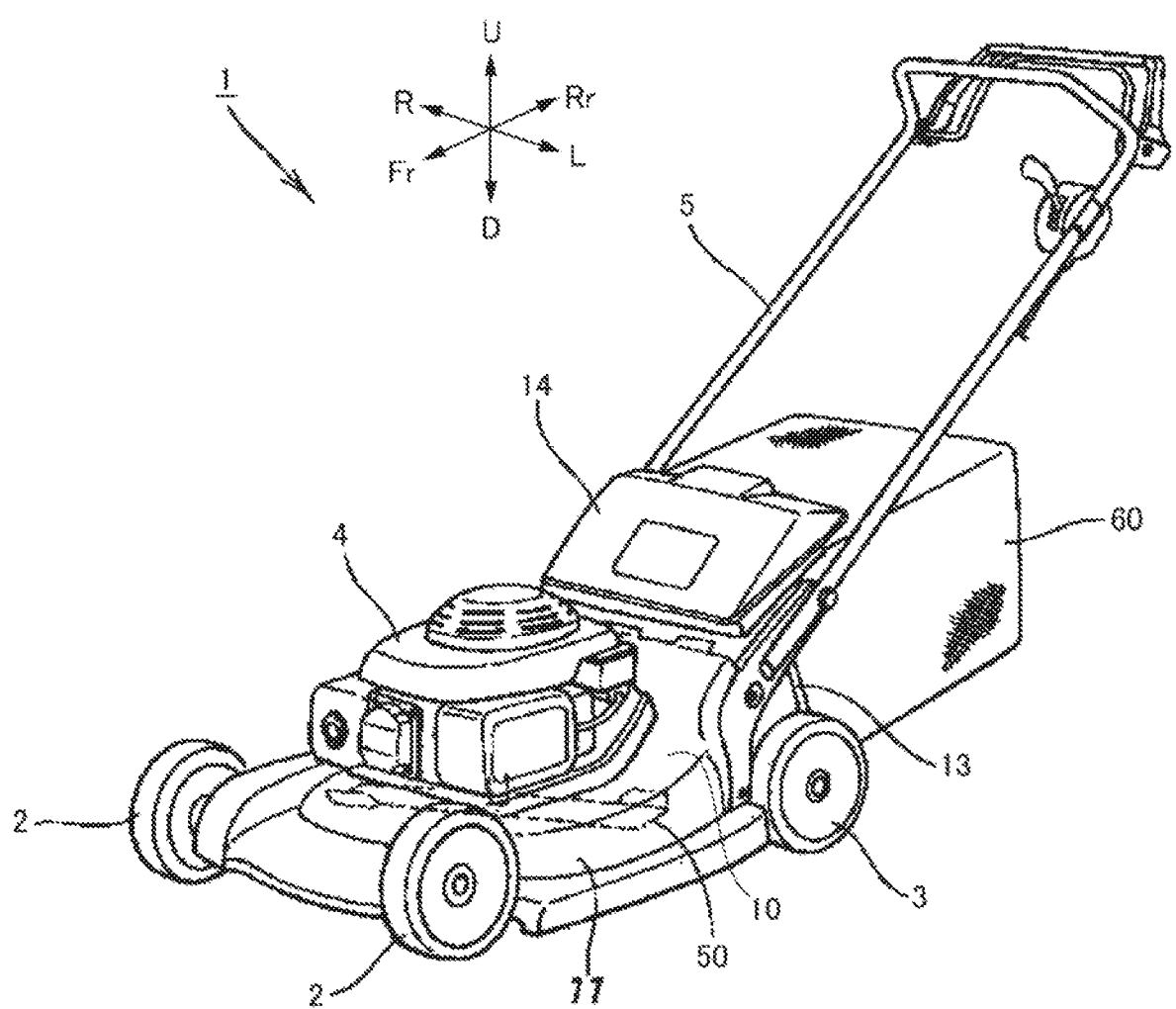
FIG. 1 is a perspective view of a lawn mower according to an embodiment of the present invention.

A lawn mower according to embodiments of the present invention will be described below with reference to the accompanying drawings. In the drawings, front, rear, left, right, upper, and lower sides follow a direction from which an operator takes views and a front side relative to a lawn mower 1 is denoted by Fr, a rear side is denoted by Rr, a left side is denoted by L, a right side is denoted by R, an upper side is denoted by U, and a lower side is denoted by D, respectively. The drawings are viewed in a direction of the reference numerals.

Figure 2:
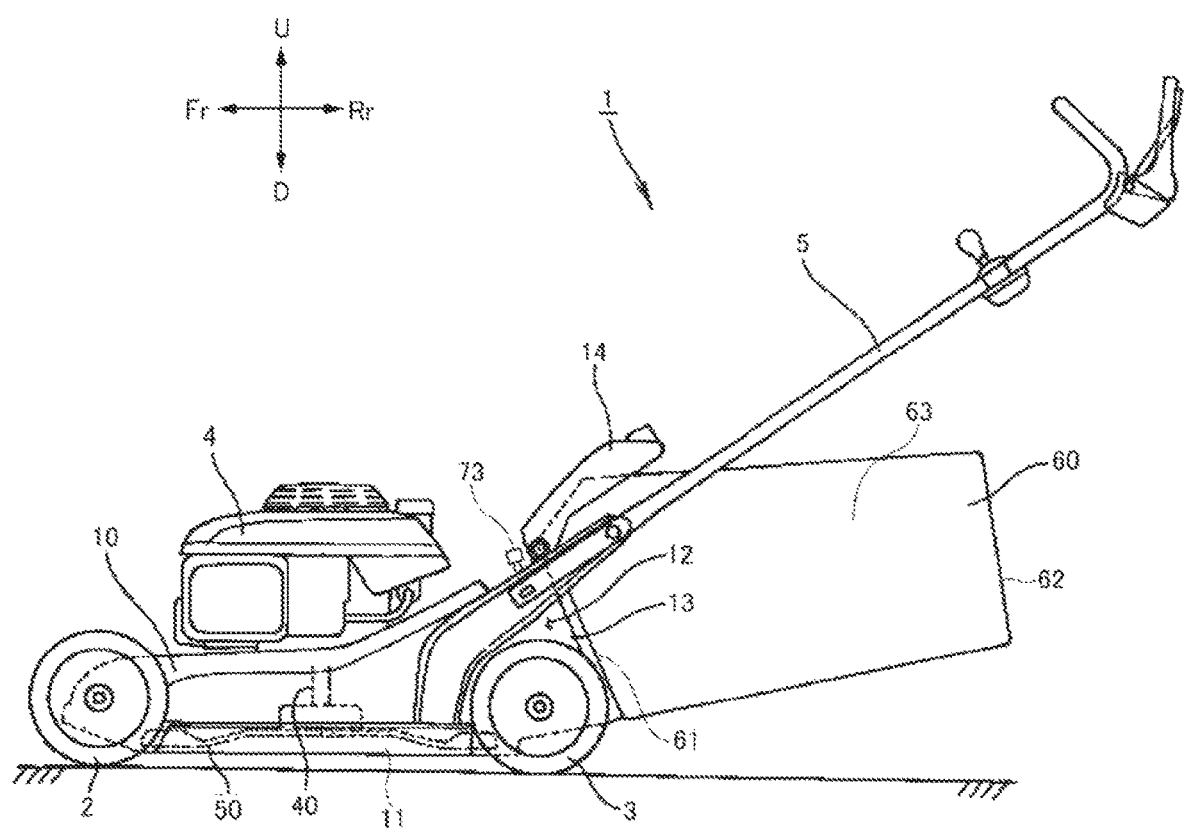
FIG. 2 is a left view of the lawn mower in FIG. 1.

As shown in FIGS. 1 and 2, the lawn mower 1 according to the present embodiment includes a body portion 10 serving as a mower body, a pair of left and right front wheels 2 provided at a front portion of the body portion 10, a pair of left and right rear wheels 3 provided at a rear portion of the body portion 10 (only the left wheel is shown in FIGS. 1 and 2), an engine 4 serving as a power source provided on an upper portion of the body portion 10, and an operation handle 5 extending upward and rearward from the rear portion of the body portion 10. The lawn mower 1 is moved by the operator operating the operation handle 5.

An output shaft 40 that is rotated by the power of the engine 4 extends substantially vertically downward from the engine 4. The output shaft 40 is provided with a cutter blade 50 at a lower end thereof and the cutter blade 50 cuts grass by rotating about the output shaft 40.

The body portion 10 includes a housing 11 that is opened downward and contains the cutter blade 50, and a grass clippings discharge passage 12 that discharges grass clippings cut by the cutter blade 50 from the housing 11.

The grass clippings discharge passage 12 includes an upstream opening 121 connected to the housing 11 and a downstream opening 122 that is opened rearward from a rear surface of the body portion 10. Grass clippings cut by the cutter blade 50 are ejected to the outside of the body portion 10 from the downstream opening 122 (see FIG. 3).

The body portion 10 includes a container attachment portion 13 on the rear surface thereof and the container attachment portion 13 is provided to the downstream opening 122 of the grass clippings discharge passage 12. To the container attachment portion 13, a grass clippings container 60 such as a grass bag is detachably attached and so as to cover the downstream opening 122 of the grass clippings discharge passage 12. The grass clippings container 60 contains grass clippings ejected to the outside of the body portion 10 from the downstream opening 122 of the grass clippings discharge passage 12.

The grass clippings container 60 has a substantially rectangular parallelepiped shape that is opened toward the rear surface of the body portion 10. The grass clippings container 60 includes an opening 61 that is opened toward the rear surface of the body portion 10 and is connected to the container attachment portion 13 provided on the rear surface of the body portion 10, an end surface 62 facing the opening 61, and a side surface 63 extending from the opening 61 to the end surface 62. The end surface 62 has a substantially rectangular shape and the side surface 63 has a substantially rectangular shape whose cross section has substantially the same shape as the end surface 62.

The rear surface of the body portion 10 is provided with an opening cover 14 that closes the downstream opening 122 of the grass clippings discharge passage 12 when the grass clippings container 60 is detached. In the present embodiment, the opening cover 14 is rotatable up and down about an upper end of the opening cover 14 serving as a rotation shaft.

Figure 3:
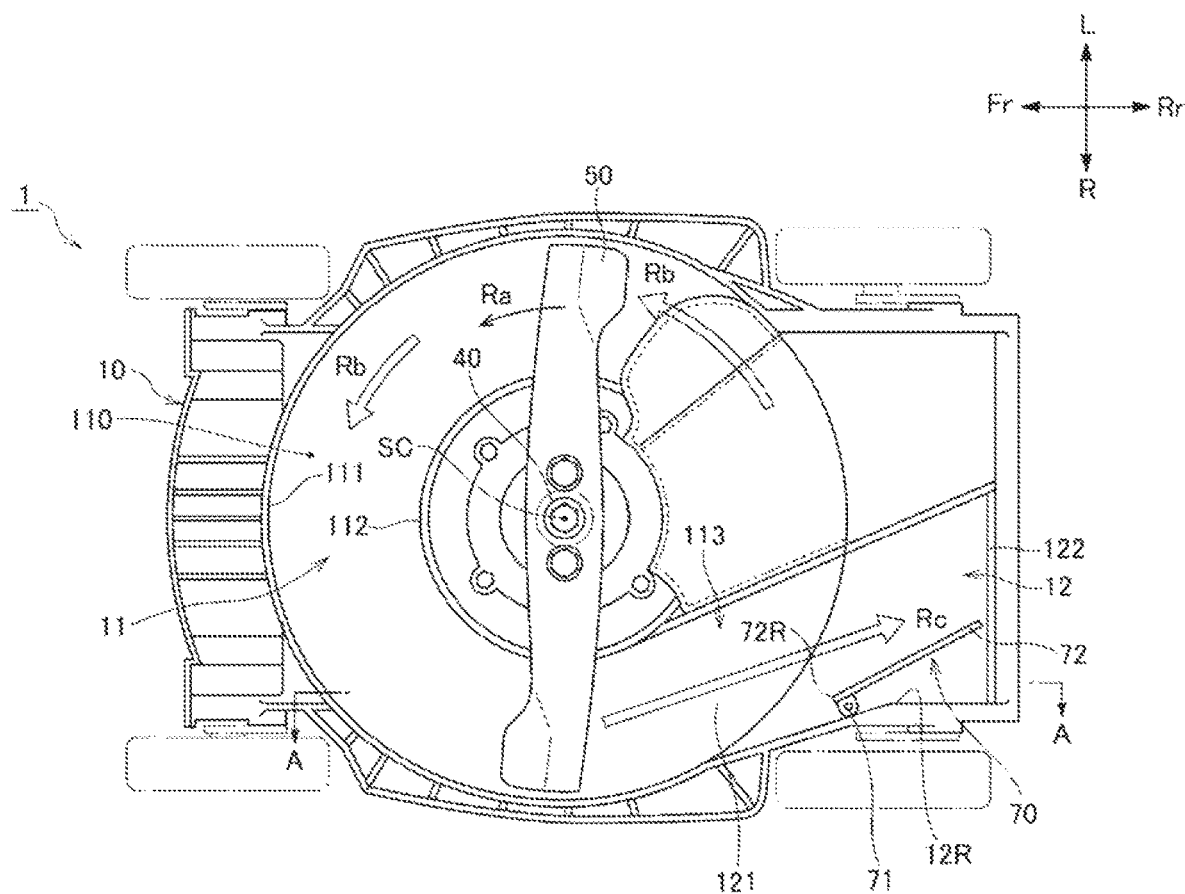
FIG. 3 is a bottom view of the lawn mower in FIG. 1.
Figure 4:
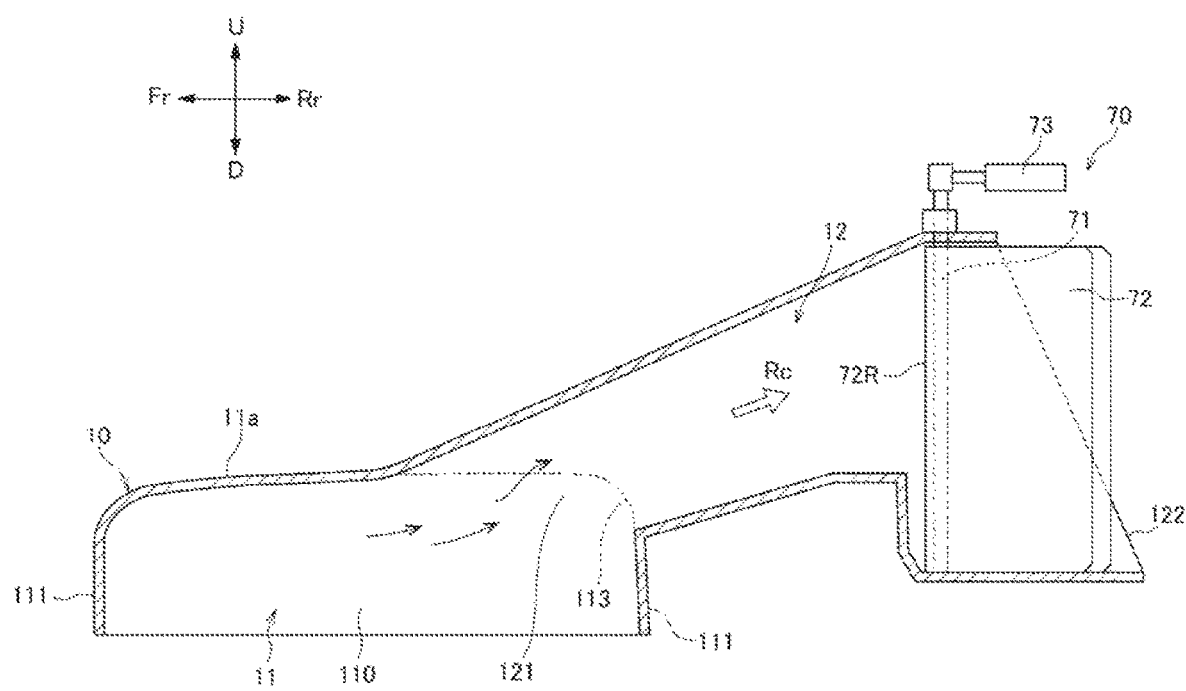
FIG. 4 is a cross-sectional view taken along a line A-A in FIG. 3.

As shown in FIGS. 3 and 4, the housing 11 includes a spiral scroll portion 110 that is substantially concentric with a shaft center SC of the output shaft 40. The scroll portion 110 is a space surrounded by a top plate 11a of the housing 11, an outer cylinder portion 111 that is concentric with the shaft center SC of the output shaft 40, and an inner cylinder portion 112 that is concentric with the shaft center SC. The inner cylinder portion 112 has a smaller diameter than the outer cylinder part 111.

The scroll portion 110 includes a passage opening 113 in a right rear portion thereof and the passage opening 113 is opened upward and rearward. The passage opening 113 is connected to the upstream opening 121 of the grass clippings discharge passage 12. The grass clippings discharge passage 12 extends rearward in a substantially tangential direction of the outer cylinder portion 111 of the scroll portion 110 as viewed from an upper-lower direction and extends rearward and upward as viewed from a left-right direction. The downstream opening 122 of the grass clippings discharge passage 12 is on a right end side of the rear surface of the body portion 10 (see FIGS. 5B and 6B).

The cutter blade 50 is rotated counterclockwise about the rotation shaft 40 by the power of the engine 4 as viewed from a bottom surface of the lawn mower 1, that is, in a direction of an arrow Ra. The cutter blade 50 clips cuts grass by rotating in the direction of the arrow Ra and generates a counterclockwise turning flow in the housing 11 as viewed from the bottom surface of the lawn mower 1, that is, in a direction of an arrow Rb.

Grass clippings cut by the cutter blade 50 turn the scroll portion 110 of the housing 11 by the turning flow and are discharged to the downstream opening 122 of the grass clippings discharge passage 12 in a direction of an arrow Rc through the grass clippings discharge passage 12. Grass clippings are then ejected to the outside of the body portion 10 and contained in the grass clippings container 60.

The downstream opening 122 of the grass clippings discharge passage 12 is provided with an opening degree adjust valve 70 that adjusts an opening degree of the downstream opening 122. The opening degree adjust valve 70 includes a flap rotation shaft 71, which extends in a substantially upper-lower direction, provided in the vicinity of the downstream opening 122 on a right side surface 12R of the grass clippings discharge passage 12, a flat flap 72 extending in the substantially upper-lower direction, and an opening degree adjust lever 73 connected to the flap rotation shaft 71.

The flap 72 is fixed to the flap rotation shaft 71 at its right end portion 72R. The flap 72 rotates in a substantially horizontal direction about the flap rotation shaft 71 by the operator operating the opening degree adjust lever 73 to rotate the flap rotation shaft 71.

With the flap 72 rotating in the substantially horizontal direction about the flap rotation shaft 71, the opening degree of the downstream opening 122 of the grass clippings discharge passage 12 and a horizontal ejecting direction of grass clippings discharged from the downstream opening 122 of the grass clippings discharge passage 12 are adjusted.

In the present embodiment, since the flap 72 rotates by the operator operating the opening degree adjust lever 73 connected to the flap rotation shaft 71, the opening degree of the downstream opening 122 of the grass clippings discharge passage 12 and the horizontal ejecting direction of grass clippings ejected from the downstream opening 122 of the grass clippings discharge passage 12 can be adjusted according to preferences of the operator.

Although the opening degree adjust valve 70 according to the present embodiment rotates the flap 72 by the operator operating the opening degree control lever 73 connected to the flap rotation shaft 71, the opening degree adjust valve 70 may also rotate the flap 72 while interlocking with the pair of left and right front wheels 2 and/or the pair of left and right rear wheels 3. In this way, the opening degree of the downstream opening 122 of the grass clippings discharge passage 12 and the horizontal ejecting direction of grass clippings ejected from the downstream opening 122 of the grass clippings discharge passage 12 can be adjusted without operation of the operator.

Figure 5A:
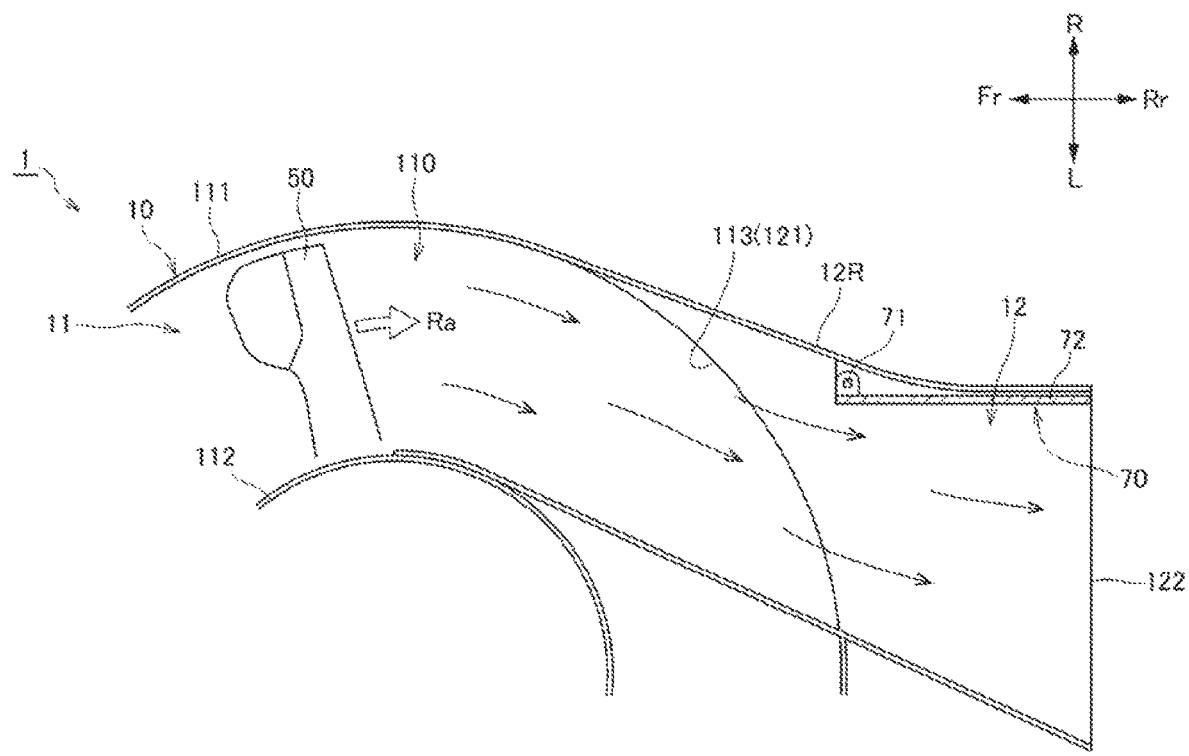
FIG. 5A is a plan sectional view of an opening degree adjust valve in a state in which a downstream opening of a grass clippings discharge passage is fully open.
Figure 5B:
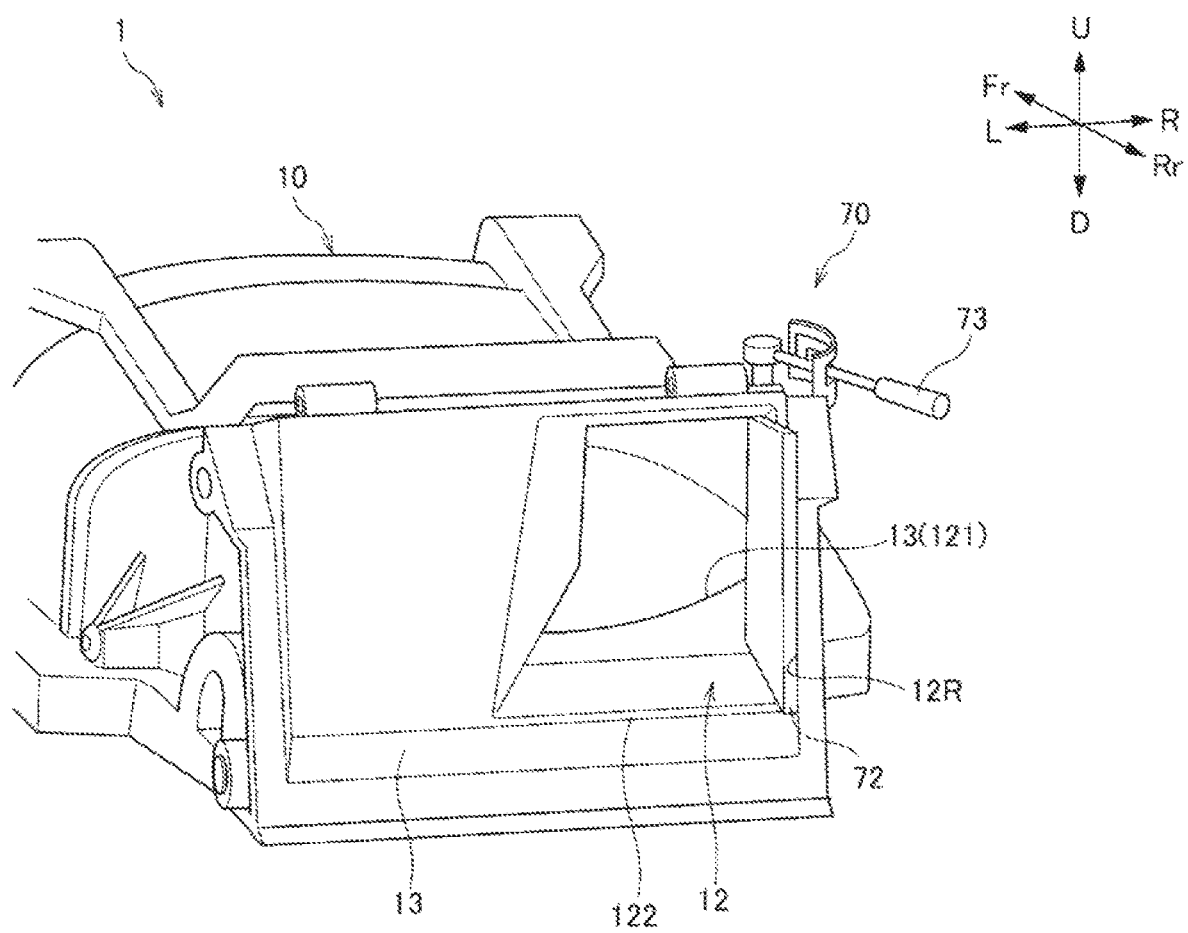
FIG. 5B is a perspective view of a rear surface of a body portion of the lawn mower in the state of FIG. 5A.

As shown in FIGS. 5A and 5B, when the flap 72 is rotated to extend substantially in the front-rear direction, grass clippings ejected from the downstream opening 122 of the grass clippings discharge passage 12 fly right rearward. At this time, the downstream opening 122 of the grass clippings discharge passage 12 is fully opened and the opening degree is maximum.

Figure 6A:
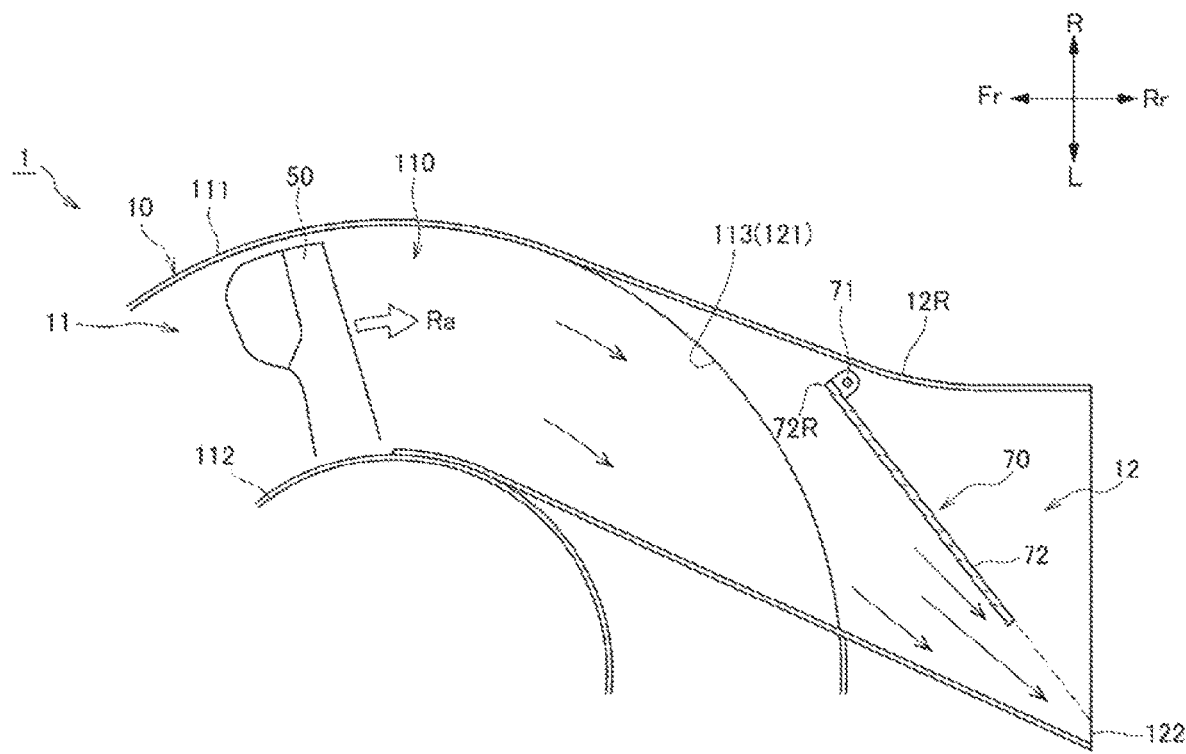
FIG. 6A is a plan sectional view of the opening degree adjust valve in a state in which an opening degree of the downstream opening of the grass clippings discharge passage is reduced.
Figure 6B:
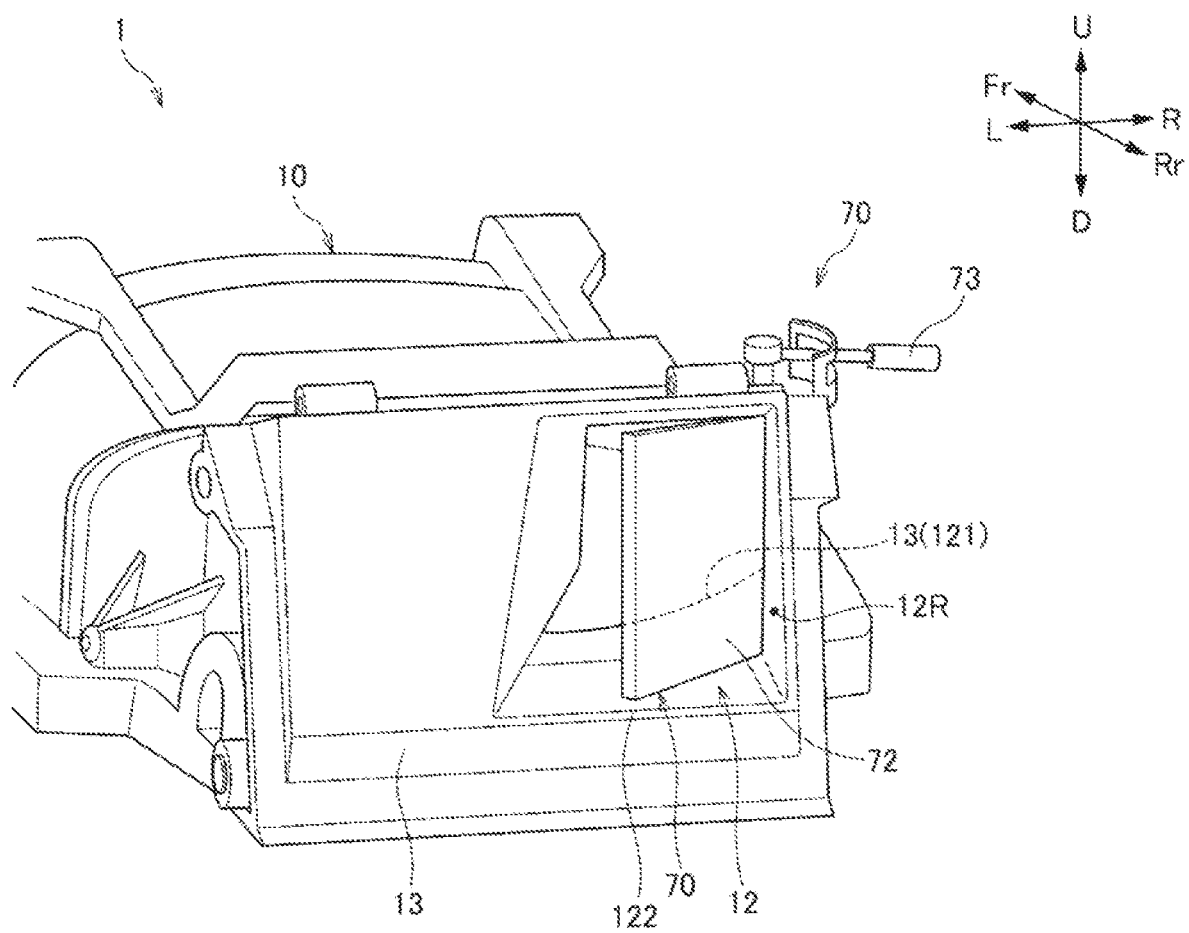
FIG. 6B is a perspective view of a rear surface of a body portion of the lawn mower in the state of FIG. 6A.

As shown in FIGS. 6A and 6B, when the flap 72 is rotated to extend obliquely leftward and rearward, grass clippings ejected from the downstream opening 122 of the grass clippings discharge passage 12 fly obliquely leftward and rearward. At this time, the downstream opening 122 of the grass clippings discharge passage 12 has a reduced opening degree than in the fully open state. When the opening degree of the downstream opening 122 of the grass clippings discharge passage 12 is reduced, a flow speed of grass clippings passing through the downstream opening 122 of the grass clippings discharge passage 12 increases. Accordingly, grass clippings ejected obliquely leftward and rearward from the downstream opening 122 of the grass clippings discharge passage 12 fly farther away from the downstream opening 122 than in the fully open state of the downstream opening 122.

Therefore, as the flap 72 is rotated such that grass clippings ejected from the downstream opening 122 of the grass clippings discharge passage 12 fly further leftward, the opening degree of the downstream opening 122 of the grass clippings discharge passage 12 is reduced and the flow speed of grass clippings passing through the downstream opening 122 of the grass clippings discharge passage 12 increases.

Since grass clippings can fly far away from the downstream opening 122 by rotating the flap 72 and reducing the opening degree of the downstream opening 122, uneven distribution of grass clippings contained in the grass clippings container 60 can be reduced in the vicinity of the downstream opening 122 of the grass clippings discharge passage 12 by adjusting the opening degree of the downstream opening 122.

Since the horizontal ejecting direction of grass clippings ejected from the downstream opening 122 of the grass clippings discharge passage 12 can be adjusted by rotating the flap 72, uneven distribution of grass clippings contained in the grass clippings container 60 can be reduced in the left-right direction.

Since the opening degree of the downstream opening 122 and the horizontal ejecting direction of grass clippings ejected from the downstream opening 122 can be adjusted by rotating the flap 72, a fly distance and an ejecting direction of grass clippings from the downstream opening 122 can be adjusted and uneven distribution of grass clippings contained in the grass clippings container 60 can be reduced in the vicinity of the downstream opening 122 of the grass clippings discharge passage 12.

Further, by rotating the flap 72, grass clippings ejected from the downstream opening 122 of the grass clippings discharge passage 12 fly to a left side opposite to the right end side of the body portion 10 on which the downstream opening 122 is provided and fly far away from the downstream opening 122. Accordingly, grass clippings can be further dispersed in the grass clippings container 60.

Although the embodiment of the present invention has been described above, the present invention is not limited thereto and modifications, improvements, or the like can be made as appropriate.

For example, the lawn mower 1 may include a power transmission device between the engine 4 and the rear wheels 3 and the rear wheels 3 may be driven by the engine 4.

For example, although the engine 4 is used as the power source in the lawn mower 1, an electric motor may be used as the power source.

For example, although the lawn mower 1 is assumed to be moved by the operator operating the operation handle 5, the lawn mower 1 may be moved by a remote operation of the operator or be automatically moved by autonomous control.

For example, although the lawn mower 1 includes the output shaft 40 extending substantially vertically downward from the engine 4 and the cutter blade 50 is provided at the lower end of the output shaft 40, the lawn mower 1 may include a rotation shaft coupled to the output shaft 40 via a gear or the like so as to transmit power, and the cutter blade 50 may be provided on the rotation shaft. Further, the rotation shaft and the output shaft 40 are not limited to the vertical direction and may be inclined by a predetermined angle from the vertical direction.

The present specification describes at least the following contents. Although corresponding constituent elements or the like in the above embodiments are shown in parentheses, the present invention is not limited thereto.

(1) A lawn mower (lawn mower 1) includes:
a power source (engine 4);
a rotation shaft (output shaft 40) configured to be rotated by power of the power source;
a cutter blade (cutter blade 50) configured to be rotated by the rotation shaft so as to cut grass;
a body portion (body portion 10) including a housing (housing 11) containing the cutter blade and a grass clippings discharge passage (grass clippings discharge passage 12) configured to discharge grass clippings cut by the cutter blade from the housing;
a grass clippings container (grass clippings container 60) detachably attached to the body portion and configured to contain grass clippings; and
an opening degree adjust valve (opening degree adjust valve 70),
wherein the grass clippings discharge passage includes:
an upstream opening (upstream opening 121) connected to the housing; and
a downstream opening (downstream opening 122) for ejecting grass clippings to outside of the body portion,
wherein the grass clippings container is provided to cover the downstream opening of the grass clippings discharge passage and configured to contain grass clippings ejected from the downstream opening of the grass clippings discharge passage, and
wherein the opening degree adjust valve is provided at the downstream opening of the grass clippings discharge passage and is configured to adjust an opening degree of the downstream opening.

According to (1), the opening degree of the opening of the grass clippings discharge passage can be adjusted by the opening degree adjust valve. Accordingly, a flow speed of grass clippings passing through the opening of the grass clippings discharge passage can be increased by reducing the opening degree of the opening of the grass clippings discharge passage. Accordingly, grass clippings can fly far away from the opening of the grass clippings discharge passage and uneven distribution of grass clippings contained in the grass clippings container can be reduced in the vicinity of the opening of the grass clippings discharge passage.

(2) In the lawn mower according to (1),
the opening degree adjust valve is configured to be driven by operation of an operator.

According to (2), the opening degree adjust valve is configured to be driven by the operation of the operator. Accordingly, the opening degree of the opening of the grass clippings discharge passage can be adjusted according to preferences of the operator.

(3) The lawn mower according to (1), further includes:
a wheel (rear wheels 3),
wherein the opening degree adjust valve is configured to be driven while interlocking with rotation of the wheel.

According to (3), the opening degree adjust valve is configured to be driven while interlocking with rotation of the wheel of the lawn mower. Accordingly, the opening degree of the opening of the grass clippings discharge passage can be adjusted without operation of the operator.

(4) In the lawn mower according to any one of (1) to (3), the opening degree adjust valve includes a flap (flap 72) configured to rotate in a substantially horizontal direction, and the flap is configured to rotate to adjust the opening degree of the downstream opening of the grass clippings discharge passage and an ejecting direction of grass clippings from the downstream opening in the substantially horizontal direction.

According to (4), the opening degree adjust valve includes the flap configured to rotate in the substantially horizontal direction and the opening degree of the downstream opening of the grass clippings discharge passage and the substantially horizontal ejecting direction of grass clippings from the downstream opening can be adjusted by rotating the flap in the substantially horizontal direction. Accordingly, a fly distance and an ejecting direction of grass clippings from the opening can be adjusted and uneven distribution of grass clippings can be further reduced in the vicinity of the opening of the grass clippings discharge passage.

(5) In the lawn mower according to (4), the downstream opening of the grass clippings discharge passage is provided on one end side (right end side) in a left-right direction of a rear surface of the body portion, and the flap is configured to rotate in the substantially horizontal direction about a flap rotation shaft (flap rotation shaft 71) provided on a side surface (right side surface 12R) of the one end side of the grass clippings discharge passage, the flap rotation shaft extending in an upper-lower direction.

According to (5), the downstream opening of the grass clippings discharge passage is provided on the one end side in the left-right direction of the rear surface of the body portion, and the flap rotates, as viewed in the upper-lower direction, in the substantially horizontal direction about the flap rotation shaft, which extends in the upper-lower direction, provided on a body outer side surface of the grass clippings discharge passage. Therefore, when a rotation position of the flap is adjusted such that grass clippings fly right rearward of the downstream opening of the grass clippings discharge passage, the opening degree of the downstream opening of the grass clippings discharge passage is maximum. As grass clippings fly to the other end side in the left-right direction from right rearward of the opening of the grass clippings discharge passage, the opening degree of the downstream opening of the grass clippings discharge passage is reduced. As grass clippings fly to the other end side in the left-right direction from the opening provided on the one end side in the left-right direction of the rear surface of the body portion, the flow speed of grass clippings passing through the downstream opening of the grass clippings discharge passage can be increased and grass clippings can fly far away from the opening of the grass clippings discharge passage. Accordingly, grass clippings can be dispersed in the grass clippings container.

The invention claimed is:

1. A lawn mower comprising:

a power source;

a rotation shaft configured to be rotated by power of the power source;

a cutter blade configured to be rotated by the rotation shaft so as to cut grass;

a body portion including a housing containing the cutter blade, and a grass clippings discharge passage configured to discharge grass clippings cut by the cutter blade from the housing;

a grass clippings container detachably attached to the body portion and configured to contain grass clippings; and an opening degree adjust valve, wherein the grass clippings discharge passage includes:
 an upstream side passage including an upstream opening connected to the housing; and
 a downstream side passage including a downstream opening for ejecting grass clippings to outside of the body portion, wherein the grass clippings container is provided to cover the downstream opening of the grass clippings discharge passage and configured to contain grass clippings ejected from the downstream opening of the grass clippings discharge passage, and wherein the opening degree adjust valve is provided at the downstream side passage of the grass clippings discharge passage and is configured to adjust a flow speed of the grass clippings passing through the downstream opening of the grass clippings discharge passage by adjusting an opening degree of the downstream opening.

2. The lawn mower according to claim 1, wherein the opening degree adjust valve is driven by operation of an operator.

3. The lawn mower according to claim 1, wherein the opening degree adjust valve includes a flap configured to rotate in a substantially horizontal direction, and wherein the flap is configured to rotate to adjust the opening degree of the downstream opening of the grass clippings discharge passage and an ejecting direction of grass clippings from the downstream opening in the substantially horizontal direction.

4. The lawn mower according to claim 3, wherein the downstream opening of the grass clippings discharge passage is provided on one end side in a left-right direction of a rear surface of the body portion, and wherein the flap is configured to rotate in the substantially horizontal direction about a flap rotation shaft provided on a side surface of the one end side of the grass clippings discharge passage, the flap rotation shaft extending in an upper-lower direction.

* * * * *